United States Patent Office 3,761,466
Patented Sept. 25, 1973

3,761,466
6 - [α-(ARYL SUBSTITUTED)-ω-AMINO-ω-CARBOXY-ACYLAMINO]PENICILLANIC ACIDS AND DERIVATIVES THEREOF
Gene M. Bright, Groton, Conn., assignor to Pfizer Inc., New York, N.Y.
No Drawing. Filed July 9, 1971, Ser. No. 161,951
Int. Cl. C07d 99/16
U.S. Cl. 260—239.1       10 Claims

ABSTRACT OF THE DISCLOSURE

A novel series of antibacterial agents; namely, 6-[α-(aryl substituted)-ω-amino - ω - carboxyacylamino]penicillanic acids of the formula:

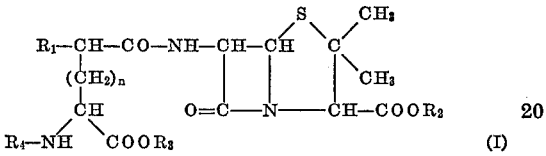

(I)

and the non-toxic, cationic salts thereof wherein:

$R_1$ is thienyl, phenyl and substituted phenyl;
$R_2$ is hydrogen and acyloxy lower alkyl;
$R_3$ is hydrogen, lower alkyl and benzyl;
$R_4$ is selected from the group consisting of hydrogen and carbobenzoxy; and
$n$ is 0 or 1.

BACKGROUND OF THE INVENTION

This invention relates to a novel series of broad-spectrum antibacterial agents and, more particularly, to a series of 6-[α-(aryl substituted)-ω-amino-ω-carboxyacylamino]penicillanic acids and the non-toxic salts and esters thereof.

Recent developments in the chemistry of penicillin antibiotics have given rise to: (1) 6-(ω-carboxyacylaminoacylamino)penicillanic acids wherein the 6-(ω-carboxyacylaminoacylamino) moiety is:

HOOC—X—CO—NH—CHR'—CO—NH—   (II)

wherein X is, interalia, a direct linkage, a divalent alkyl group of 1 to 6 carbon atoms, or a phenylene group; and R' is alkyl of 1 to 6 carbon atoms, phenyl, phenylalkyl or a heterocyclic group (U.S. 3,320,240, issued May 16, 1967); (2) 6-aminoacylaminoacylaminopenicillanic acids wherein the 6-aminoacylaminoacylamino moiety is inter alia

H$_2$N—CHR'$_1$—CO—NH—
              CHX$_1$—CO—NH—   (II-A)

wherein each of $X_1$ and $R'_1$ is, for example, hydrogen, lower alkyl, phenyl and phenyl lower alkyl (U.S. 3,340,252, issued Sept. 5, 1967). Further, a variety of 6-(α-substituted acylamino)penicillanic acids wherein the acylamino moiety is, for example, α-carboxyarylacetylamino (U.S. 3,142,673, issued July 28, 1964), glycylamino or substituted glycylamino (U.S. 3,080,356, issued Mar. 5, 1963) is known.

SUMMARY OF THE INVENTION

There has now been found a novel class of broad-spectrum antibacterial agents; namely, 6-[α-(aryl substituted)-ω-amino - ω - carboxyacylamino]penicillanic acids of Formula I

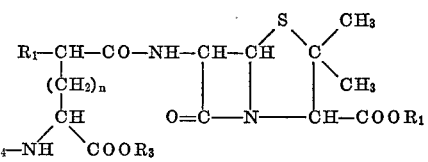

and the non-toxic, cationic salts thereof wherein:

$R_1$ is selected from the group consisting of thienyl, phenyl and substituted phenyl wherein the substituent is selected from the group consisting of lower alkyl, lower alkoxy, trifluoromethyl and di-(lower alkyl) amino;
$R_2$ is selected from the group consisting of hydrogen and acyloxy lower alkyl wherein the acyloxy moiety is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl;
$R_3$ is selected from the group consisting of hydrogen, lower alkyl and benzyl;
$R_4$ is selected from the group consisting of hydrogen and carbobenzoxy; and
$n$ is 0 or 1.

The penicillanic acid derivatives described herein can exist in optically inactive forms as well as in optically active forms by reason of the asymmetrical carbon atoms present in the substituent group at the 6-position. Such forms are included within the scope of this invention.

Also included within the scope of this invention are the non-toxic, cationic, e.g., the pharmaceutically-acceptable, salts of the novel compounds of this invention in which at least one of the acid groups is involved in salt formation. Salts such as the sodium, aluminum, potassium, calcium, magnesium, ammonium and substituted ammonium salts, e.g., procaine, dibenzylamine, N,N'-dibenzylethylenediamine, N,N' - bis(dehydroabietyl)ethylenediamine, 1-ephenamine, N-ethylpiperidine, N-benzyl-β-phenethylamine, triethylamine, as well as salts with other amines which have been used to form salts with benzylpenicillin are useful for the preparation of pharmaceutically-elegant compositions of these valuable antibiotics.

As those skilled in the art will recognize, a wide variety of esters of the herein described compounds is possible, including those in which one or both of the carboxy groups is esterified. Typical ester groups are those disclosed in U.S. Pat. 3,574,189, issued Apr. 6, 1971, which describes a large number of alkyl, substituted alkyl, aryl, substituted aryl, alkenyl, aralkyl, alkynyl and cycloalkyl esters of α-carboxyarylmethylpenicillins.

The favored esters of the herein described compounds are those wherein the carboxy group of the penicillanic acid moiety is esterified with an acyloxy lower alkyl group wherein the acyloxy group is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl since they tend to enhance oral activity of the products. Particularly valuable compounds of this invention are those of Formula I wherein $R_1$ is phenyl or thienyl and each of $R_3$ and $R_4$ is hydrogen.

The preferred "lower alkyl," "lower alkoxy," and "lower alkanoyloxy" groups are those alkyl, alkoxy and alkanoyloxy groups having up to, and including, four carbon atoms. The starting materials necessary to prepare products having such groups are readily available. The term "thienyl" used herein includes the 2-thienyl and 3-thienyl groups.

The novel antibacterial products of this invention are of value as additives to materials such as fuels and cutting oils which are subject to bacterial deterioration. They are also useful in soaps and shampoos and in topical compositions for treatment of wounds, and are remarkably effective in treating a number of infections caused by susceptible gram-negative and gram-positive bacteria in poultry and animals, including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc. or in capsules alone or in admixture with the same or equivalent excipients. They may also be administered orally in the form of elixirs or oral suspensions which may contain flavoring or coloring agents or be injected parenterally, that is, intramuscularly or subcutaneously. For parenteral administration, they are best used in the form of a sterile solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc., buffering agents, as well as local anesthetics and inorganic salts to afford desirable pharmacological properties.

DETAILED DESCRIPTION OF THE INVENTION

The novel and valuable compounds of this invention are prepared from 6-aminopenicillanic acid or an ester thereof by any of several known methods for introducing an acyl substituent into a primary amine. The acyl substituent is derived from an appropriately protected acid of the formula:

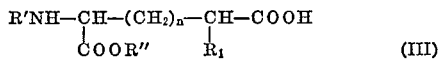

(III)

wherein $R_1$ is as defined above; $R'$ is an amino protective group; and $R''$ is hydrogen or a carboxy protective group. Suitable amino protective groups are carbobenzoxy and substituted carbobenzoxy groups, trityl and o-nitrophenylsulfenyl. The preferred amino protective group is the carbobenzoxy group because of its ease of removal.

The carboxy group can be protected, for example, by esterification with alcohols or phenols which are easily removed by alkaline hydrolysis or by hydrogenolysis. Representative of such alcohols and phenols are those which contain electron-attracting groups such as nitro, cyano, sulfoxyl, carboxy esters and benzyl alcohols.

The 6-aminopenicillanic acid reactant can be used in a variety of forms. It can, for example, be used as the free acid or as an alkali metal or amine salt thereof. The use of a salt form of 6-aminopenicillanic acid is frequently of advantage since the solubility of the 6-aminopenicillanic acid reactant can be manipulated by judicious choice of the salt to permit the use of aqueous or non-aqueous systems. Alkali metal salts of 6-aminopenicillanic acid are valuable for use in aqueous systems. In non-aqueous systems an amine salt such as a tertiary lower alkylamine salt, e.g., triethylamine, or an N-alkyl piperidine salt is generally used. Alternatively, an ester of 6-aminopenicillanic acid is used, especially in non-aqueous systems. In those instances wherein the final product (Formula I) is desired in the form of an ester ($R_2$ is other than hydrogen), it is obvious and practical to use that ester form of the 6-aminopenicillanic reactant. Representative of such esters are the benzyl, cyanomethyl, phenacyl, methyl and methoxymethyl which are described in U.S. Pat. 3,528,965; acyloxy lower alkyl esters such as are taught in Belgium Pat. 721,515; and silyl esters of the type reported in U.S. Pat. 3,249,622.

The acylation of the appropriate 6-aminopenicillanic acid (free acid, a salt or ester) reactant is conducted according to any of several known procedures. The acid reactant of Formula III can be reacted with the appropriate 6-aminopenicillanic acid derivative in a reaction-inert solvent in the presence of a "condensing" agent such as a carbodiimide, an alkoxyacetylene, N,N'-carbonyldiimidazole, N,N'-carbonylditriazole and hexahalocyclotriphosphatriazines. Aqueous or non-aqueous solvent systems can be used when a carbodiimide is the condensing agent. The remaining agents enumerated are useful in non-aqueous solvent systems. When using a carbodiimide in an aqueous system, the pH is desirably adjusted to the range of about 5 to about 8, and preferably to about 6. In the usual procedure, the Formula III reactant and 6-aminopenicillanic acid are mixed in equimolar proportions in water and the pH brought to the desired level. A water-miscible organic solvent (dioxane or tetrahydrofuran) containing the carbodiimide condensing agent is added at room temperature and the mixture stirred for several hours until reaction is complete. Temperatures of from about —5° to 30° C. are generally used. In most instances, an excess up to about 10% of the condensing agent is used. The penicillin product is recovered by methods known to the art.

Another method of acylation comprises coupling 6-aminopenicillanic acid or a salt or ester thereof with a reactive derivative of an acid of Formula III. The reactive derivative can be an acid halide or mixed anhydride. The reaction is generally conducted in an aqueous solvent system over the pH range of about 5 to about 9 and the temperature range of about —5° to 50° C. It can also be conducted in unstable emulsions of water and a water-immiscible organic solvent such as methyl isobutyl ketone and lower alkyl acetates over the pH range of about 2 to 4. Additionally, the appropriate acid azide or an active ester or thio ester of the carboxy group of the acid reactant of Formula III ($R''$=carboxy protective group) with, for example, N-hydroxyphthalimide, N-hydroxysuccinimide, a phenol or thiophenol, can be used as acylating agent. The products are recovered by known procedures.

In addition to the above purely chemical techniques of acylation, a sonochemical technique, that is, the application of vibrations of ultrasonic frequency (35,000 to 90,000 cycles per second), as described in U.S. Pat. 3,079,314, issued Feb. 26, 1963, can also be used to achieve acylation of 6-aminopenicillanic acid, especially acylation with an acid halide or anhydride. Acylation under such conditions is rapid and permissive of a wide range of reaction media, aqueous and non-aqueous alike, homogeneous and non-homogeneous, including emulsified systems.

The esters of this invention, compounds of Formula I wherein $R_2$ is acyloxy(lower alkyl), are prepared by reacting an alkali metal salt (sodium, potassium, lithium) or a tertiary lower alkyl amine salt (e.g., triethylamine) of the penicillins of Formula I wherein $R_2$ is hydrogen with the appropriate acyloxy(lower alkyl)halide (chloride or bromide) of the formula $R_2$-halide. The reaction is normally conducted in a reaction-inert solvent such as tetrahydrofuran, dimethylformamide, dimethylsulfoxide or hexamethylphosphoramide. In practice, the halide is added, preferably dropwise, to a solution or suspension of an alkali metal or amine salt of the compound of Formula I wherein $R_2$ is hydrogen. At least one mole of the halide reactant is added per mole of penicillin compound, but in certain cases it may be advantageous to employ as much as a 50 percent excess. The reaction may be carried out at temperatures of from 0° to 50° C. with a preferred range of from 20° to 30° C. Reaction time will vary according to the temperature employed and the reactivity of the appropriate starting materials. Normally, the reaction period will range anywhere from one to twenty hours.

Upon completion of the reaction, the desired product is isolated by such standard means as by concentration of the reaction mixture. The residue is treated with acetone or methylene chloride to dissolve the penicillin compound and separate it from the inorganic salt by-product. Evaporation of the acetone or methylene chloride solvent, preferably in vacuo, provides the product, generally in a crude state of purity. Further purification of the desired product is achieved by conventional recrystallization techniques or by chromatographing over a polyamide resin such as Polyamide CC-6, a polycaprolactam distributed by Brinkman Instruments, Westbury, N.Y.

The acyloxy(lower alkyl) esters can also be prepared by the above described acylation procedures but using the appropriate acyloxy(lower alkyl) 6-aminopenicillanate in place of 6-aminopenicillanic acid or a salt thereof. The acyloxy(lower alkyl) 6-aminopenicillanates are prepared by reacting an alkali metal or amine salt of 6-aminopenicillanic acid with the appropriate chloro (or bromo) lower alkyl acyloxy reactant in a suitable solvent as is described above in Belgium Pat. 721,515 and by Daehne et al., J. Med. Chem., 13, 607, 612 (1970).

The halides of the formula $R_2$-halide are synthesized from the corresponding acid chlorides and aldehydes or ketones in accordance with the general procedures of Ulich et al., J. Am. Chem. Soc. 43, 660 (1921) and Euranto et al., Acta. Chem. Scand. 20, 1273 (1966). The formation of esters from acid salts and alkyl halides is well documented in the chemical literature (Zook and Wagner, "Synthetic Organic Chemistry," John Wiley and Sons, Inc., New York, 1956, p. 484).

The necessary reactants for Formula III are prepared by condensation of the appropriate $\alpha$-($R_1$-substituted)-$\omega$-bromo-alkanoic acid ester of the formula

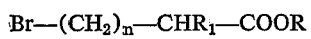

with the sodio derivative of an appropriately protected amino malonic acid derivative, such as a diester of carbobenzoxyamino malonic acid. The favored esters of both reactants are the methyl and ethyl esters which are easily prepared. The $\omega$-carbobenzoxyamino-$\omega$,$\omega$-bis(alkoxycarbonyl)-2-($R_1$-substituted)alkanoic acid esters thus prepared are then saponified and decarboxylated to the corresponding $\omega$-carbobenzoxyamino-$\omega$-carboxy-2-($R_1$-substituted)alkanoic acids. Said alkanoic acid derivatives are capable of forming cyclic anhydrides since they are succinic or glutaric acid derivatives. They are cyclized to anhydrides by treatment with acetic anhydride. The resulting anhydride is then treated with an alcohol or phenol with which it is desired to protect the carboxy group to form a half ester of the $\alpha$-carbobenzoxyamino-$\alpha'$-($R_1$-substituted)-succinic or glutaric acid. This reaction takes advantage of the greater reactivity of the anhydride carbonyl group nearest the aminomethyl moiety over that of the other anhydride carbonyl group with the 6-aminopenicillanic acid nucleophile. The thus produced acid is then coupled with 6-aminopenicillanic acid or a salt or ester thereof according to one of the acrylation procedures described above. The protective groups are removed by appropriate known methods, e.g., benzyl and carbobenzoxy groups by catalytic hydrogenation.

The $\alpha$-bromo-($R_1$-substituted) acetic acid ester reactants ($R_1$—CHBrCOOR) are prepared by digesting the appropriate substituted mandelic acid ester in chloroform solution with excess phosphorous pentabromide (Walden, Ber. 28, 1296, 1895). An alternative method for their preparation comprises bromination of the appropriate substituted mandelic acid ester in carbon tetrachloride solution under the influence of ultraviolet light (Belgian Pat. 622,439; C.A. 59, 11352c, 1963).

The $\alpha$-($R_1$-substituted)-$\beta$-bromo-alkanoic acid ester reactants ($R_1$—CH(CH$_2$Br)COOR) are prepared by the method of Testa et al., Ann. 639, 166 (1961); C.A. 55, 27270i (1961). This method involves reacting the appropriate arylglyoxylic acid ester ($R_1$COCOOR) with acetone cyanohydrin and potassium cyanide. The $\alpha$-aryl-$\alpha$-hydroxy-cyanoacetic acid ester thus produced is then reacted with acetic acid anhydride and pyridine to give $\alpha$-aryl-$\alpha$-acetoxycyanoactic acid ester which is then converted to $\alpha$-aryl-$\beta$-amino-propionic acid ester hydrochloride by hydrogenation over Pd/C in the presence of concentrated hydrochloric acid. The ester is hydrolyzed to the acid which is reacted with sodium nitrite in acetic acid to form $\alpha$-aryl-$\beta$-propiolactone. Subsequent treatment of the lactone with hydrogen bromide provides the desired $\alpha$-aryl-$\beta$-bromopropionic acid.

The novel penicillins described herein exhibit in vitro activity against a wide variety of microorganisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like or for sterilization purposes, e.g., sick-room utensils.

These novel penicillins are also effective antibacterial agents in vivo in animals, including man, not only via the parenteral route of administration but also by the oral route of administration. The oral and parenteral dosage levels for the herein described compounds are on the order of up to 200 mg./kg. and 100 mg./kg. of body weight per day, respectively. In general, the oral and parenteral dosage levels range from about 25-200 mg./kg. and from about 10-100 mg./kg. of body weight per day, respectively.

Those compounds of this invention of Formula I wherein $R_4$ is carbobenzoxy and $R_3$ is benzyl while useful as antibacterial agents are primarily of value as intermediates for compounds of Formula I wherein $R_3$ and $R_4$ are hydrogen.

Many of the penicillin ester compounds of this invention exhibit improved absorption on oral administration over that produced by the corresponding free acid or alkali metal salt forms. They, therefore, represent convenient and effective dosage forms of the novel penicillins of Formula I above.

Further, many of the esters, especially the acyloxy(lower alkyl) esters described herein, although inactive or of relatively low activity against gram-negative organisms per se, are when administered orally to animals, including man, metabolized to the parent acid which has a wide spectrum of activity against gram-positive and gram-negative bacteria. They thus serve as pro-drug forms of the parent compounds since they are biologically converted in vivo to said compounds. The rate of metabolic conversion of such esters to the parent acid occurs at such a rate as to provide an effective and prolonged concentration of the parent acid in the animal body. In effect such esters act as depot sources for the parent acid. Especially useful in this respect are the acyloxy(lower alkyl) esters wherein the ester group is a benzoyloxymethyl-, acetoxymethyl-, pivaloyloxymethyl- or 2-ethylbutyryloxymethyl ester.

Also effective as antibacterial agents are acyloxyalkyl esters of Formula I compounds wherein the acyloxyalkyl ester moiety is —C(Y₁)(Y₂)—O—CO—W' in which Y₁ is hydrogen and Y₂ is selected from the group consisting of alkoxyalkyl and alkylthioalkyl each containing up to 6 carbon atoms, cycloalkyl of from 3 to 6 carbon atoms, phenylalkyl and mono- and disubstituted phenylalkyl wherein said substituent is selected from the group consisting of alkyl containing up to 3 carbon atoms, chlorine, bromine, fluorine, and alkoxy and alkylthio each containing up to 2 carbon atoms, alkyl, alkoxyalkyl and alkylthioalkyl each containing up to 6 carbon atoms, cycloalkyl of from 3 to 6 carbon atoms;

Y₁ and Y₂ when taken together with the carbon atom to which they are attached form a ring system of the formula:

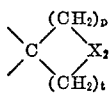

wherein X₂ is selected from the group consisting of CH₂, O and S; and p and t are each integers of from 1 to 3;

W' is selected from the group consisting of cycloalkyl of from 3 to 8 carbon atoms, phenylalkyl and mono- and disubstituted phenylalkyl wherein said alkyl portion consists of 1 to 3 carbon atoms and said substituents are each chosen from the group consisting of chloro, bromo, fluoro, lower alkoxy, lower alkylthio, lower alkanoylamino, lower alkyl, trifluoromethyl and N,N-di-(n-propyl)sulfamyl; phenyl and mono- and disubstituted phenyl wherein the substituents are chosen from the group consisting of lower alkyl, lower alkoxy, chloro, bromo, fluoro and trifluoromethyl.

EXAMPLE I 6-(3-amino-3-carboxy-2-phenylpropionamido) penicillanic acid disodium salt (A) Diethyl carbobenzoxyaminomalonate: To a slurry of diethyl aminomalonate hydrochloride (10.5 g., 0.05 mole) and potassium carbonate (6.9 g., 0.05 mole) in benzene (200 ml.) at reflux is added carbobenzoxy chloride (8.7 g., 0.051 mole) in benzene (50 ml.) over a half-hour period. The mixture is refluxed for three hours and then evaporated to dryness under reduced pressure. The white, solid residue is taken up in ethyl acetate-water (50 ml. of each) and the pH of the aqueous phase adjusted to 2.0 with 6 N hydrochloric acid. The mixture is thoroughly agitated, the ethyl acetate phase separated and the aqueous phase extracted again with ethyl acetate (2× 25 ml.). The combined extracts are washed successively with dilute hydrochloric acid (2× 20 ml.) and saturated brine (2× 20 ml.) and then dried (Na₂SO₄). Removal of the solvent under reduced pressure gives the product as a clear oil (16.2 g.).

NMR spectrum (CDCl₃): τ 8.77 (6H, t, J=7 Hz.), methyl protons; τ 5.80 (4H, q, J=7 Hz.), ethyl ester methylene protons; τ 4.95 (1H, d, J= Hz.), methine proton; τ 4.17 (1H, d, J= Hz.), N—H proton; τ 4.88 (2H, S) carbobenzoxy methylene protons; τ 2.70 (5H, S) phenyl ring protons.
Infrared spectrum (CHCl₃): 1750 cm.⁻¹ (strong).
Mass spectrum: molecular ion at m/e 309.

(B) 3 - carbobenzoxyamino-3,3-bis(ethoxycarbonyl)-2-phenylpropionic acid ethyl ester: Sodium hydride (2.0 g. of 55%; 0.046 mole) is added portionwise to a solution of diethyl carbobenzoxyaminomalonate (14.8 g., 0.046 mole) in dry N,N-dimethylformamide over a fifteen minute period. Moisture is excluded from the reaction mixture which is stirred at room temperature for fifteen minutes and then warmed to 50° C. for five minutes. The mixture is cooled to room temperature and a solution of ethyl α-bromophenylacetate (11.1 g., 0.046 mole) in dry N,N- dimethylformamide (50 ml.) added dropwise over a half-hour period. The mixture is stirred at room temperature for three hours and then at 90° C. for one hour. It is cooled to room temperature, water (250 ml.) added, and the mixture extracted with ethyl acetate (3× 50 ml.). The combined extracts are washed first with water (4× 25 ml.), then with saturated brine (2× 25 ml.) and dried (Na₂SO₄)

Evaporation of the solvent gives the product as a yellowish oil (22.8 g.) which is used directly in the next step.

NMR spectrum (CDCl₃): ca. τ 8.83 (9H, overlapping t patterns, J=7 Hz.), methyl groups; ca. τ 5.83 (6H, overlapping of patterns, J=7 Hz.), ethyl ester methylene protons; τ 4.87 (1H, S), methine proton; τ 5.08 (2H, S), carbobenzoxy methylene protons; τ 3.95 (1H, S) N—H proton; τ 2.73 (10H, S), aromatic protons.
Infrared spectrum (CHCl₃): 1750 cm.⁻¹ (broad, strong).
Mass spectrum: molecular ion at m/e 471.

(C) 3 - carbobenzoxyamino-3-carboxy-2-phenylpropionic acid: A solution of 3 - carbobenzoxyamino - 3,3-bis-(ethoxycarbonyl)-2-phenylpropionic acid ethyl ester (22.7 g., 0.048 mole) in ethanol (50 ml.) is added to a solution of potassium hydroxide (10.7 g., 0.192 mole) in water (125 ml.). The mixture is heated to 80°-90° C. for four hours and then cooled to room temperature. The alcohol is evaporated off under reduced pressure and water (50 ml.) added to the residue. The aqueous solution is washed with ethyl acetate (1× 50 ml.) and then layered with ethyl acetate (50 ml.). The aqueous phase is brought to pH 2.0 by addition of 6 N hydrochloric acid, and the aqueous and organic layers thoroughly mixed. The ethyl acetate layer is separated and the aqueous phase extracted with ethyl acetate (2× 50 ml.). The combined extracts are washed with water (2× 25 ml.), saturated brine (2× 25 ml.) and dried over anhydrous sodium sulfate. Removal of the solvent in vacuo leaves the crude product as a yellow oil (15.6 g.).

The oil is dissolved in chloroform and hexane added to precipitate the product as a white solid (6.1 g.).

Repetition of the above procedure but using 95.0 g. (0.2 mole) of 3 - carbobenzoxyamino-3,3-bis(ethoxycarbonyl)-2-phenylpropionic acid ethyl ester, 52.0 g. (0.8 mole) of potassium hydroxide, 500 ml. water and 200 ml. ethanol produces 68.8 g. of the title product as a yellow oil.

NMR spectrum (CD₃OD): τ 2.75 (10H, broad S), aromatic protons; τ 5.05 (2H, S), carbobenzoxy methylene protons; τ 5.25 (1H, d, J=6 Hz.), methine proton; τ 5.67 (1H, d, J=6 Hz.), methine proton; acid and N—H protons exchanged.
Infrared spectrum (CHCl₃): 1725 cm.⁻¹ (strong).
Mass spectrum: molecular ion at m/e 343.

(D) α-Phenyl - α' - carbobenzoxyamino succinic anhydride: A mixture of acetic anhydride (10.0 ml.) and 3-carbobenzoxyamino-3-carboxy-2 - phenylpropionic acid (8.6 g.) is vigorously stirred at room temperature for one-half hour and then heated on a water bath at 70°-80° C. for 1.5 hours. The mixture is then evaporated to dryness under reduced pressure and in the absence of moisture to give the product as an amber semi-solid.

Infrared spectrum (CHCl₃): 1725 cm.⁻¹ (strong); 1800, 1825 (strong and medium, respectively), cm.⁻¹.

(E) 3 - carbobenzoxyamino-3-carbobenzoxy-2-phenylpropionic acid: The anhydride of preparation D (7.1 g., 0.023 mole) is added to benzyl alcohol (2.44 g., 0.023 mole) and the mixture stirred and heated on an oil bath at 170° C. for four hours. It is cooled to room temperature and allowed to stand for one week during which time it became completely solid.

NMR spectrum (CHCl$_3$): $\Upsilon$ 2.7 and $\Upsilon$ 2.8 (15H, 2 broad singlets), aromatic protons; $\Upsilon$ 4.9–5.3 (6H, broad $m$), methine protons and carbobenzoxy protons; $\Upsilon$ 3.17 (1H, broad S), N—H proton; $\Upsilon$ 1.27 (1H, S), carboxylic acid proton.

Infrared spectrum (CHCl$_3$): 1725–1750 cm.$^{-1}$ (broad, strong).

Repetition of this procedure but using a lower alkanol, e.g., methanol, ethanol, n-propanol, isopropanol, n-butanol or t-butanol, in place of benzyl alcohol provides the corresponding lower alkyl esters.

(F) 6 - (3 - carbobenzoxyamino - 3 - carbobenzoxy-2-phenylpropionamido)penicillanic acid triethylamine salt: To a solution of 3-carbobenzoxyamino-3-carbobenzoxy-2-phenylpropionic acid (0.91 g., 2.1 mM.) in dry methylene chloride (20 ml.) is added triethylamine (0.34 ml., 2.4 mM.) and the mixture chilled to 0° C. Ethyl chloroformate (0.23 g., 2.1 mM.) is added and the reaction mixture stirred at 0° C. for fifteen minutes. The triethylamine salt of 6-aminopenicillanic acid (0.76 g., 2.4 mM.) in dry methylene chloride (15 ml.) is added all at once, the mixture stirred at 0° C. for five minutes, removed from the cooling bath and allowed to warm to room temperature. After stirring for one hour at room temperature, the solvent is removed in vacuo and the residue taken up in ethyl acetate (100 ml.), water (100 ml.) is added and the pH adjusted to 2.5 with 6 N hydrochloric acid. The ethyl acetate layer is separated and the aqueous phase extracted further with ethyl acetate (2× 60 ml.). The extracts are combined, water (100 ml.) added and the mixture vigorously stirred. The apparent pH of the mixture is adjusted to 7.5 by addition of saturated aqueous sodium bicarbonate solution. The aqueous layer is separated and extracted with ethyl acetate (3× 100 ml.). The aqueous phase is layered with ethyl acetate (100 ml.), the mixture stirred vigorously and the pH brought to 2.5 by the addition of 6 N hydrochloric acid. The ethyl acetate phase is separated once, the aqueous phase extracted twice more with ethyl acetate (2× 60 ml.). Triethylamine (0.34 ml., 2.4 mM.) is added to the combined extracts and the ethyl acetate evaporated in vacuo. The residual foam is triturated with ether 15 (ml.) to give a vanilla-colored powder (300 mg.).

NMR spectrum (CDCl$_3$): $\Upsilon$ 8.4 (6H, S), methyl groups of thiazolidine ring; $\Upsilon$ 5.68 (1H, S), methine proton at 3-position of thiazolidine ring; $\Upsilon$ 5.17–4.5 (8H, complex $m$), methine protons of amido side-chain moiety and methylene protons of benzyl and carbobenzoxy moieties; $\Upsilon$ 2.75 (15, broad S), aromatic protons.

Infrared spectrum: 1783 cm.$^{-1}$ (strong); 1725–1740 cm.$^{-1}$ broad, strong).

In like manner, but using the appropriate 3-carbobenzoxyamino-3-carbo(lower alkoxy) - 2 - phenyl propionic acids in place of the related 3-carbobenzoxy derivative provides the corresponding 6 - (3-carbobenzoxyamino-3-carbo(lower alkoxy)-2-phenylpropionamido)penicillanic acids as their triethylamine salts.

(G) 6 - (3-amino-3-carboxy-2-phenylpropionamido)-penicillanic acid disodium salt: A suspension of 25% Pd/BaCO$_3$ (200 mg.) in water (30 ml.) is pre-hydrogenated at 40 p.s.i. for two hours. The title product of preparation F (50 mg.) and sodium bicarbonate (one equivalent) are added and the penicillanic acid subjected to hydrogenation at 40 p.s.i. for five hours at room temperature. The reaction mixture is filtered and the filtrate freeze-dried to give the title product.

The use of potassium bicarbonate in place of sodium bicarbonate provides the dipotassium salt.

Substitution of the 6 - (3-carbobenzoxyamino-3-carbo (lower alkoxy)-2-phenylpropionamido)penicillanic acid salts of preparation F for the title product of preparation F in this procedure affords the corresponding 6-(3-amino-3-carbo(lower alkoxy)-2 - phenylpropionamido)penicillanic acid disodium (or dipotassium) salts.

EXAMPLE II 6-(4-amino-4-carboxy-2-phenylbutyramido)penicillanic acid disodium salt The procedures of Example I are repeated but using $\beta$-bromo-$\alpha$-phenylpropionic acid ethyl ester in preparation B in place of ethyl $\alpha$-bromophenyl acetate to give the title product.

The use of a lower alkanol (methanol, ethanol, isopropanol, or n-butanol in preparation E of Example I provides the lower alkyl esters of the title compound; namely: 6-(4-amino - 4 - carbo(lower alkoxy)-2-phenylbutyramido)penicillanic acid disodium salts.

EXAMPLE III 6-(3-amino-3-carboxy-2-phenylpropionamido)penicillanic acid disodium salt To a solution of 3-carbobenzoxyamino-3-carbobenzoxy-2-phenylpropionic acid (0.91 g., 2.1 mM., Example I–E) in tetrahydrofuran (20 ml.) there is added 1,3-dicyclohexylcarbodiimide (0.43 g., 2.1 mM.), followed by a solution of 6-aminopenicillanic acid (0.45 g., 2.1 mM.) in water-tetrahydrofuran (50 ml. of 1:1) containing sufficient sodium bicarbonate to give a pH of 7.8. The mixture is stirred at room temperature for two hours and then filtered to remove 1,3-dicyclohexylurea. The filtrate is diluted with water (100 ml.), the pH adjusted to 2.5 with 6 N hydrochloric acid and then extracted with ethyl acetate (4× 50 ml.). The combined extracts are dried (Na$_2$SO$_4$) and evaporated to dryness. The residue is taken up in ethyl acetate (50 ml.), water (50 ml.) added, the mixture stirred and brought to pH 7.5 by addition of saturated aqueous sodium bicarbonate. The aqueous phase is separated, washed with ethyl acetate (2× 10 ml.) and freeze dried.

Hydrogenation according to Example I–G affords the title compound.

EXAMPLE IV

Pivaloyloxymethyl 6-(3-amino-3-carboxy-2-phenyl-propionamido)penicillanate 1,3-dicyclohexylcarbodiimide (5 mM.) in methylene chloride (50 ml.) is added to a solution of 3-carbobenzoxyamino - 3 - carbobenzoxy - 2 - phenylpropionic acid (5 mM.) in methylene chloride (50 ml.). Pivaloyloxymethyl 6-aminopenicillanate (5 mM.) in methylene chloride (30 ml.) is added, the mixture stirred at room temperature for two hours, and then filtered to remove 1,3-dicyclohexylurea. The filtrate is evaporated under reduced pressure. Hydrogenation of the residue according to Example I–G gives the title product.

This procedure is repeated but using the appropriate acyloxymethyl 6-aminopenicillanate to produce acyloxymethyl 6-(3-amino - 3 - carboxy-2-phenyl-propionamido)-penicillanates wherein the acyloxymethyl moiety is:

acetoxymethyl
propionyloxymethyl
isobutyryloxymethyl
$\alpha$-ethyl-n-butyryloxymethyl
n-butyryloxymethyl
benzyloxymethyl
2-methylbenzoyloxymethyl
4-trifluoromethylbenzoyloxymethyl

EXAMPLE V

The following compounds are prepared from appropriate reactants by the methods of Examples I-III:

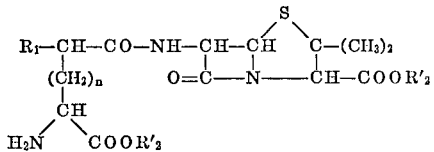

| R₁ | n | R'₂ | Example |
|---|---|---|---|
| 2-methylphenyl | 0 | Na | I |
| 3-methylphenyl | 0 | Na | I |
| 4-methylphenyl | 0 | Na | I |
| 4-ethylphenyl | 0 | Na | I |
| 2-n-butylphenyl | 0 | Na | I |
| 4-isopropylphenyl | 0 | Na | I |
| 2-dimethylaminophenyl | 0 | Na | III |
| 4-dimethylaminophenyl | 0 | Na | III |
| 3-diethylaminophenyl | 0 | Na | I |
| 2-trifluoromethylphenyl | 0 | Na | I |
| 3-trifluoromethylphenyl | 0 | Na | I |
| 4-trifluoromethylphenyl | 0 | Na | I |
| 4-n-propoxyphenyl | 0 | Na | I |
| 3-thienyl | 0 | Na | III |
| 2-thienyl | 0 | Na | III |
| 2-methylphenyl | 1 | Na | I |
| 4-methylphenyl | 1 | Na | I |
| 3-isopropylphenyl | 1 | Na | I |
| 4-n-butylphenyl | 1 | Na | III |
| 3-dimethylaminophenyl | 1 | Na | III |
| 2-di-(n-butyl)aminophenyl | 1 | Na | III |
| 2-methoxyphenyl | 1 | Na | I |
| 4-methoxyphenyl | 1 | Na | I |
| 3-n-propoxyphenyl | 1 | Na | I |
| 2-thienyl | 1 | Na | III |
| 3-thienyl | 1 | Na | III |

EXAMPLE VI

Repetition of the procedure of Example IV but using the appropriate acyloxymethyl 6-aminopenicillanate and ω-carbobenzoxyamino-ω-carbobenzoxy-α - R₁ substituted alkanoic acid (Formula III) reactants affords the following compounds:

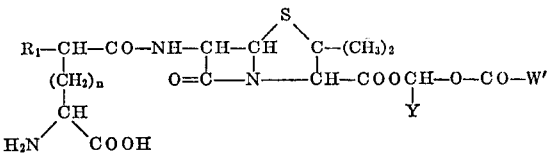

| R₁ | n | W' | Y |
|---|---|---|---|
| 2-methylphenyl | 0 | C(CH₃)₃ | H |
| Do | 0 | CH₃ | H |
| Do | 0 | n-C₃H₇ | H |
| 3-methylphenyl | 0 | C(CH₃)₃ | H |
| 4-methylphenyl | 0 | C(CH₃)₃ | H |
| Do | 0 | C₆H₅ | H |
| 4-ethylphenyl | 0 | CH₂CH(C₂H₅)CH₃ | H |
| 4-isopropylphenyl | 0 | CH(CH₃)₂ | H |
| 2-methylphenyl | 0 | 2-CH₃C₆H₄ | H |
| 4-methylphenyl | 0 | 4-(n-C₄H₉)C₆H₄ | H |
| 4-ethylphenyl | 0 | 4-CF₃C₆H₄ | H |
| Phenyl | 1 | CH₃ | CH₃ |
| Do | 1 | C(CH₃)₃ | H |
| Do | 1 | C₆H₅ | H |
| Do | 1 | 4-CH₃C₆H₄ | H |
| Do | 1 | 2-CF₃C₆H₄ | H |
| 2-methylphenyl | 1 | C₂H₅ | CH₃ |
| Do | 1 | CH(CH₃)₂ | H |
| 3-methylphenyl | 1 | 3-BrC₆H₄ | H |
| 4-methylphenyl | 1 | CH₂CH(C₂H₅)CH₃ | H |
| 3-isopropylphenyl | 1 | 4-ClC₆H₄ | H |
| 4-(n-butyl)phenyl | 1 | 4-(C₂H₅O)C₆H₄ | H |
| 2-trifluoromethylphenyl | 0 | CH₃ | CH₃ |
| Do | 0 | 4-(C₂H₅O)C₆H₄ | H |
| 3-trifluoromethylphenyl | 0 | C₆H₅ | CH₃ |
| 4-trifluoromethylphenyl | 0 | 4-BrC₆H₄ | H |
| 2-dimethylaminophenyl | 0 | C(CH₃)₃ | H |
| 4-dimethylaminophenyl | 0 | C(CH₃)₃ | H |
| Do | 0 | C₂H₅ | H |
| 2-methoxyphenyl | 0 | 3-(CH₃O)C₆H₄ | H |
| 4-n-propoxyphenyl | 0 | CH₃ | n-C₃H₇ |
| 3-thienyl | 0 | CH₃ | CH₃ |
| Do | 0 | C(CH₃)₃ | H |
| Do | 0 | CH₂CH(C₂H₅)CH₃ | H |
| Do | 0 | C₆H₅ | C₂H₅ |
| 2-thienyl | 0 | C₂H₅ | H |
| Do | 0 | 4-CH₃C₆H₄ | H |
| 2-trifluoromethylphenyl | 1 | C₂H₅ | CH₃ |
| Do | 1 | 3-FC₆H₄ | H |
| 3-trifluoromethylphenyl | 1 | CH(CH₃)₂ | H |
| 4-trifluoromethylphenyl | 1 | C(CH₃)₃ | H |
| Do | 1 | 3-CH₃C₆H₄ | H |
| 3-dimethylaminophenyl | 1 | CH₂-CH(C₂H₅)CH₃ | H |
| 4-dimethylaminophenyl | 1 | n-C₃H₇ | CH₃ |
| 2-di-(n-butyl)aminophenyl | 1 | C(CH₃)₃ | H |
| 3-thienyl | 1 | CH₃ | CH₃ |
| Do | 1 | C(CH₃)₃ | H |
| Do | 1 | CH₃ | C₂H₅ |
| Do | 1 | C₆H₅ | H |
| Do | 1 | 4-CF₃C₆H₄ | H |
| 2-thienyl | 1 | C₂H₅ | CH₃ |
| Do | 1 | CH(CH₃)₂ | H |
| Do | 1 | C₆H₅ | H |

EXAMPLE VII

The procedure of Examples III and IV are repeated but using the appropriate ω-carbobenzoxyamino - ω - carbo (lower alkoxy)-α-phenylalkanoic acid as the acyl contributing reagent, and 6-aminopenicillanic acid or appropriate acyloxymethyl ester thereof, to give the compounds listed below:

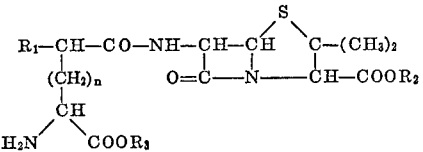

| R₁ | n | R₂ | R₃ |
|---|---|---|---|
| Phenyl | 0 | Acetoxymethyl | Methyl |
| Do | 0 | Acetoxyethyl | Do. |
| Do | 0 | Pivaloyloxymethyl | Do. |
| Do | 0 | Benzoyloxymethyl | Ethyl |
| Do | 0 | 4-methylbenzoyloxymethyl | n-Butyl |
| 2-methylphenyl | 0 | H | Methyl |
| Do | 0 | H | Isopropyl |
| Do | 0 | α-Ethyl-n-butyryloxymethyl | Ethyl |
| 3-methylphenyl | 0 | H | t-Butyl |
| Do | 0 | Isobutyryloxymethyl | Methyl |
| 4-methylphenyl | 0 | H | Ethyl |
| Do | 0 | Propionyloxymethyl | Methyl |
| 2-n-butylphenyl | 0 | n-Butyryloxymethyl | t-Butyl |
| 2-trifluoromethylphenyl | 0 | Pivaloyloxymethyl | Ethyl |
| Do | 0 | Benzoyloxymethyl | Do. |
| 3-trifluoromethylphenyl | 0 | H | Do. |
| 4-trifluoromethylphenyl | 0 | H | n-Propyl |
| Do | 0 | Propionyloxymethyl | Methyl |
| 2-methoxyphenyl | 0 | α-Ethyl-n-butyryloxymethyl | Do. |
| 4-n-propoxyphenyl | 0 | H | Ethyl |
| 2-dimethylaminophenyl | 0 | H | n-Butyl |
| Do | 0 | Propionyloxymethyl | Ethyl |
| 3-diethylaminophenyl | 0 | 4-methylbenzoyloxymethyl | Do. |
| 4-dimethylaminophenyl | 0 | H | Methyl |
| 3-thienyl | 0 | H | Do. |
| Do | 0 | Acetoxyethyl | Do. |
| Do | 0 | α-Ethyl-n-butyryloxymethyl | Ethyl |
| Do | 0 | 4-chlorobenzoyloxymethyl | Do. |
| 2-thienyl | 0 | Isobutyryloxymethyl | Do. |
| Do | 0 | H | n-Butyl |
| Phenyl | 1 | Acetoxymethyl | Methyl |
| Do | 1 | Isobutyryloxymethyl | Do. |
| Do | 1 | Benzoyloxymethyl | Ethyl |
| 2-methylphenyl | 1 | H | n-Butyl |
| Do | 1 | Propionyloxymethyl | Ethyl |
| 3-methylphenyl | 1 | ....do.... | Do. |
| 4-methylphenyl | 1 | H | n-Propyl |
| 2-trifluoromethylphenyl | 1 | Acetoxymethyl | Methyl |
| Do | 1 | ....do.... | Isopropyl |
| 4-trifluoromethylphenyl | 1 | Propionyloxymethyl | Ethyl |
| 3-isopropylphenyl | 1 | H | Do. |
| Do | 1 | 4-(CF₃)-benzoyloxymethyl | Methyl |
| 4-methoxyphenyl | 1 | Pivaloyloxymethyl | Do. |
| 3-n-propoxyphenyl | 1 | ....do.... | Do. |
| 2-di-(n-butyl)aminophenyl | 1 | Acetoxymethyl | Do. |
| 4-dimethylaminophenyl | 1 | H | Do. |
| 3-thienyl | 1 | Isobutyryloxymethyl | Ethyl |
| Do | 1 | H | Do. |
| Do | 1 | Benzoyloxymethyl | Do. |
| 2-thienyl | 1 | Pivaloyloxymethyl | Methyl |
| Do | 1 | H | n-Propyl |

EXAMPLE VIII

The salts of the penicillin products of Examples I through VII are transformed to their acid forms by careful neutralization of aqueous solutions thereof with Dowex 50, acid form (a strong cation exchange sulfonated polystyrene resin available from The Dow Chemical Co.) and lyophilized, after filtration, to give the free acids.

The free acids of the preceding examples are transformed to their sodium, potassium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with one equivalent of the appropriate base per acid group present. The salts are recovered by freeze drying.

When each of $R_2$ and $R_3$ in Formula I compounds is hydrogen, the monocationic salts are produced by reacting the compounds with one mole of the appropriate base in the manner described above.

EXAMPLE IX

A tablet base is prepared by blending the following ingredients in the proportion by weight indicated:

| | |
|---|---|
| Sucrose | 80.0 |
| Tapioca starch | 12.5 |
| Magnesium stearate | 7.5 |

Sufficient 6-(3-amino-3-carboxy-2-phenylpropionamido)penicillanic acid disodium salt is blended into the base to provide tablets containing 25, 100, and 250 mg. of active ingredients.

EXAMPLE X

Capsules containing 25, 100 and 250 mg. of active ingredient are prepared by blending appropriate amounts of pivaloyloxymethyl 6-(3-amino-3-carboxy-2-phenylpropionamido)penicillanate in the following mixture (proportions given in parts by weight):

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE XI

A suspension of 6-(4-amino-4-carboxy-2-phenylbutyramido)penicillanic acid disodium salt is prepared with the following composition:

| | | |
|---|---|---|
| Penicillin compound | g | 31.42 |
| 70% aqueous sorbitol | g | 714.29 |
| Glycerine, U.S.P. | g | 185.35 |
| Gum acacia (10% solution) | ml | 100.00 |
| Polyvinyl pyrrolidone | g | 0.50 |
| Propyl parahydroxybenzoate | g | 0.172 |
| Distilled water to make 1 liter | g | 0.094 |

Various sweetening and flavoring agents may be added to this suspension as well as acceptable coloring. The suspension contains approximately 25 mg. of penicillin compound per milliliter.

EXAMPLE XII

A parenteral form of 6-[3-amino-3-carboxy-2-(3-thienyl)propionamido]penicillanic acid is prepared by dissolving an intimate mixture of the disodium salt of the penicillin compound and sodium citrate (4 percent by weight) in sufficient polyethylene glycol 200 such that the final concentration of the penicillin compound is 25 mg. of active ingredient per milliliter. The resulting solution is sterilized by filtration and sterilely stoppered in vials.

In like manner, formulations of the products of this invention are made.

PREPARATION A

Ethyl α-bromo-(substituted) phenyl acetates

The appropriate substituted mandelic acid (1.0 mole) in 957 g. carbon tetrachloride is heated to boiling and irradiated with ultraviolet light from a 500 watt lamp. Bromine (1.52 mole) is added over a one-hour period.

After an additional three hours irradiation, the reaction mixture is concentrated and cooled. The product is purified by distillation in vacuo or, if solid, by recrystallization from a suitable solvent such as carbon tetrachloride. (Belgian 622,439; C.A. 59, 11352c, 1963.)

Alternatively, they are prepared by the procedure of Walden, Ber. 28, 1296 (1895) which comprises digesting a chloroform solution of the appropriate substituted mandelic acid ethyl ester with excess phosphorous pentabromide. The reaction mixture is washed with water, sodium carbonate solution and dried with sodium sulfate. The product is recovered by vacuum distillation.

The following compounds are thus prepared:

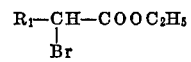

$R_1$:
- 2-methylphenyl
- 3-methylphenyl
- 4-methylphenyl
- 2-n-butylphenyl
- 4-ethylphenyl
- 4-isopropylphenyl
- 2-dimethylaminophenyl
- 4-dimethylaminophenyl
- 3-diethylaminophenyl
- 2-methoxyphenyl
- 2-trifluoromethylphenyl
- 3-trifluoromethylphenyl
- 4-trifluoromethylphenyl
- 3-thienyl
- 2-thienyl
- 4-n-propoxyphenyl

PREPARATION B

α-Aryl-β-bromopropionic acids

A mixture of the appropriate ethyl arylglyoxylate (0.56 mole) acetone cyanohydrin (200 g.) and potassium cyanide (1 g.) is held at room temperature for 1.5 hours, and then poured into water (600 ml.). The lower of the phases which forms is separated and the upper extracted with ether. The combined ether extract and lower phase is washed several times with water, dried ($Na_2SO_4$) and evaporated under reduced pressure. The residual oil is treated with acetic acid anhydride (300 ml.), cooled, mixed with pyridine (20 ml.) and allowed to stand overnight at room temperature. It is then poured into lukewarm water (700 ml.) and the aqueous mixture extracted several times with ether. The combined extracts are washed with water, dried ($Na_2SO_4$) and the ethyl α-aryl-α-acetoxycyanoacetate recovered by distillation.

The thus-produced ester is dissolved in absolute ethanol (1 g. per 25 ml.), concentrated hydrochloric acid (1 ml. per gram of ester) and hydrogenated at room temperature in the presence of 5% Pd/C (1 g. per gram of ester). As soon as gas absorption ceases, the catalyst is filtered off and the mother concentrated in vacuo. The addition of ether to the concentrate precipitates the hydrochloride salt of the ethyl α-aryl-β-aminopropionate.

The amino-ester hyldrochloride (10 g.) is dissolved in concentrated hydrochloric acid (200 ml.) and the solution refluxed for nine hours. It is evaporated to dryness under reduced pressure, the residue dissolved in water (50 ml.) and the solution neutralized to pH 7 with 10% aqueous sodium hydroxide. The solution is concentrated to about half volume and the amino acid product which separates recovered by filtration.

A solution of the above produced amino acid (0.25 mole) in acetic acid (100 ml. of 25%) is added dropwise with stirring to a solution of sodium nitrate (4.8 g.) in water (30 ml.) at 0° C. and stirring continued for one-half hour following completion of addition at 0°–5° C. The reaction mixture is extracted with benzene or ether, the combined extracts washed first with aqueous sodium carbonate and then with water, and dried. Evaporation of the solvent and vacuum distillation of the residue gives the α-aryl-β-propiolactone.

The lactone (0.1 mole) is gradually added to a 0° C. solution of acetic acid (10 ml.), saturated with hydrogen chloride (first at room temperature, then at 0° C.). The mixture is held for two hours at room temperature and then heated to 80° C. for two hours. The acetic acid is evaporated in vacuo to give the α-aryl-β-bromopropionic acid. The product is taken up in ether, and the ether evaporated. The residue, if an oil, is distilled in vacuo; and if a solid, is recrystallized from petroleum ether or ligroin.

In this manner, the following α-aryl-β-bromopropionic acids are prepared:

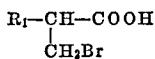

$R_1$:
- phenyl
- 2-methylphenyl
- 3-methylphenyl
- 4-methylphenyl
- 4-ethylphenyl
- 2-methoxyphenyl
- 4-methoxyphenyl
- 3-n-propoxyphenyl
- 4-n-butylphenyl
- 3-isopropylphenyl
- 2-trifluoromethylphenyl
- 3-trifluoromethylphenyl
- 4-trifluoromethylphenyl
- 2-dimethylaminophenyl
- 3-dimethylaminophenyl
- 4-dimethylaminophenyl
- 2-di-(n-butyl)aminophenyl
- 3-thienyl
- 2-thienyl

What is claimed is:

1. A compound of the formula:

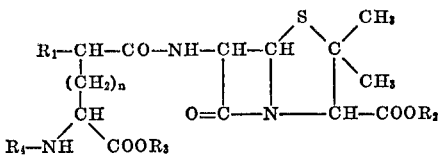

and the non-toxic cationic salts thereof wherein:

$R_1$ is selected from the group consisting of thienyl, phenyl and substituted phenyl wherein the substituent is selected from the group consisting of lower alkyl, lower alkoxy, trifluoromethyl and di-(lower alkyl)amino;

$R_2$ is selected from the group consisting of hydrogen and acyloxy lower alkyl wherein the acyloxy moiety is selected from the group consisting of lower alkanoyloxy, benzoyloxyl and substituted benzoyloxy wherein the substituent is selected from the group consisting of chloro, bromo, fluoro, lower alkyl, lower alkoxy and trifluoromethyl;

$R_3$ is selected from the group consisting of hydrogen, lower alkyl and benzyl;

$R_4$ is selected from the group consisting of hydrogen and carbobenzoxy; and $n$ is 0 or 1.

2. A compound according to claim 1 wherein $R_1$ is phenyl; each of $R_3$ and $R_4$ is hydrogen, $n$ is zero; and $R_2$ is hydrogen or lower alkanoyloxy lower alkyl.

3. A compound according to claim 1 wherein $R_1$ is thienyl; each of $R_3$ and $R_4$ is hydrogen; $R_2$ is lower alkanoyloxy lower alkyl; and $n$ is 0.

4. A compound according to claim 1 wherein $R_1$ is phenyl; each of $R_2$ and $R_4$ is hydrogen; $R_3$ is lower alkyl; and $n$ is 1.

5. A compound according to claim 1 wherein $R_1$ is thienyl; $n$ is 0; and each of $R_2$, $R_3$ and $R_4$ is hydogen.

6. A compound according to claim 1 wherein $R_2$ is lower alkanoyloxy lower alkyl, and $n$ is 0.

7. A compound according to claim 2 wherein $n$ is 0, and $R_2$ is hydrogen.

8. A compound according to claim 3 wherein $R_2$ is 2-thienyl; and $R_2$ is acetoxymethyl.

9. A compound according to claim 5 wherein $R_1$ is 3-thienyl.

10. A compound according to claim 6 wherein $R_2$ is pivaloyloxymethyl.

References Cited
UNITED STATES PATENTS 3,142,673  7/1964  Hobbs _____ 260—239.1
3,282,926  11/1966  Brain et al. _____ 260—239.1

NICHOLAS S. RIZZO, Primary Examiner

U.S. Cl. X.R.

424—271

PO-1050
(5/69)

UNITED STATES PATENT OFFICE
CERTIFICATE OF CORRECTION

Patent No. 3,761,466            Dated September 25, 1973

Inventor(s) Gene M. Bright

It is certified that error appears in the above-identified patent and that said Letters Patent are hereby corrected as shown below:

Column 16, Line 33, "$R_2$" should read --$R_1$--.

Signed and sealed this 2nd day of April 1974.

(SEAL)
Attest:

EDWARD M. FLETCHER, JR.
Attesting Officer

C. MARSHALL DANN
Commissioner of Pate